(12) United States Patent
Jungreis

(10) Patent No.: US 6,184,593 B1
(45) Date of Patent: Feb. 6, 2001

(54) UNINTERRUPTIBLE POWER SUPPLY

(75) Inventor: Aaron M. Jungreis, Cary, NC (US)

(73) Assignee: ABB Power T&D Company Inc., Raleigh, NC (US)

( * ) Notice: Under 35 U.S.C. 154(b), the term of this patent shall be extended for 0 days.

(21) Appl. No.: 09/363,530

(22) Filed: Jul. 29, 1999

(51) Int. Cl.[7] ........................................ H02J 7/14
(52) U.S. Cl. ................................. 307/64; 307/80
(58) Field of Search ..................... 307/64, 65, 68, 307/80, 81, 87; 323/9, 210; 363/84

(56) References Cited

U.S. PATENT DOCUMENTS

| | | | |
|---|---|---|---|
| 5,198,971 | * 3/1993 | Recker et al. | 363/71 |
| 5,610,452 | 3/1997 | Shimer et al. | 307/89 |
| 5,612,581 | 3/1997 | Kageyama | 307/64 |
| 5,646,458 | * 7/1997 | Bowyer et al. | 307/67 |
| 5,694,307 | 12/1997 | Murugan | 363/37 |
| 5,745,356 | 4/1998 | Tassitino, Jr. et al. | 363/71 |
| 5,745,670 | 4/1998 | Linde | 395/182.2 |
| 5,767,591 | 6/1998 | Pinkerton | 307/64 |
| 5,939,798 | * 8/1999 | Miller | 307/64 |
| 5,994,794 | * 11/1999 | Wehrlen | 307/66 |

* cited by examiner

Primary Examiner—Josie Ballato
Assistant Examiner—Robert L. DeBeradinis
(74) Attorney, Agent, or Firm—Woodcock Washburn Kurtz Mackiewicz & Norris LLP

(57) ABSTRACT

An electronic circuit, such as a UPS, interfaces a main ac power source and at least one secondary power source to a load. The secondary power source(s) may include one or more auxiliary generators, a flywheel motor generator or microturbine with high speed motor generator, and/or any of a variety of dc storage devices. The electronic circuit includes a dc bus, a first uncontrolled rectifier in combination with a first filter for coupling the main ac power supply to the dc bus, one or more additional uncontrolled rectifier(s) and filter(s) for coupling the auxiliary generator(s) to the dc bus, and a dc-to-ac inverter (between the dc bus and the load) for providing ac output power to the load. The advantages of reduced parts count, increased compatibility between the generator(s) and the electronic circuit, and a simpler method for paralleling many storage and generation devices with a very high power factor to the sources, regardless of the load power factor, are provided.

19 Claims, 3 Drawing Sheets

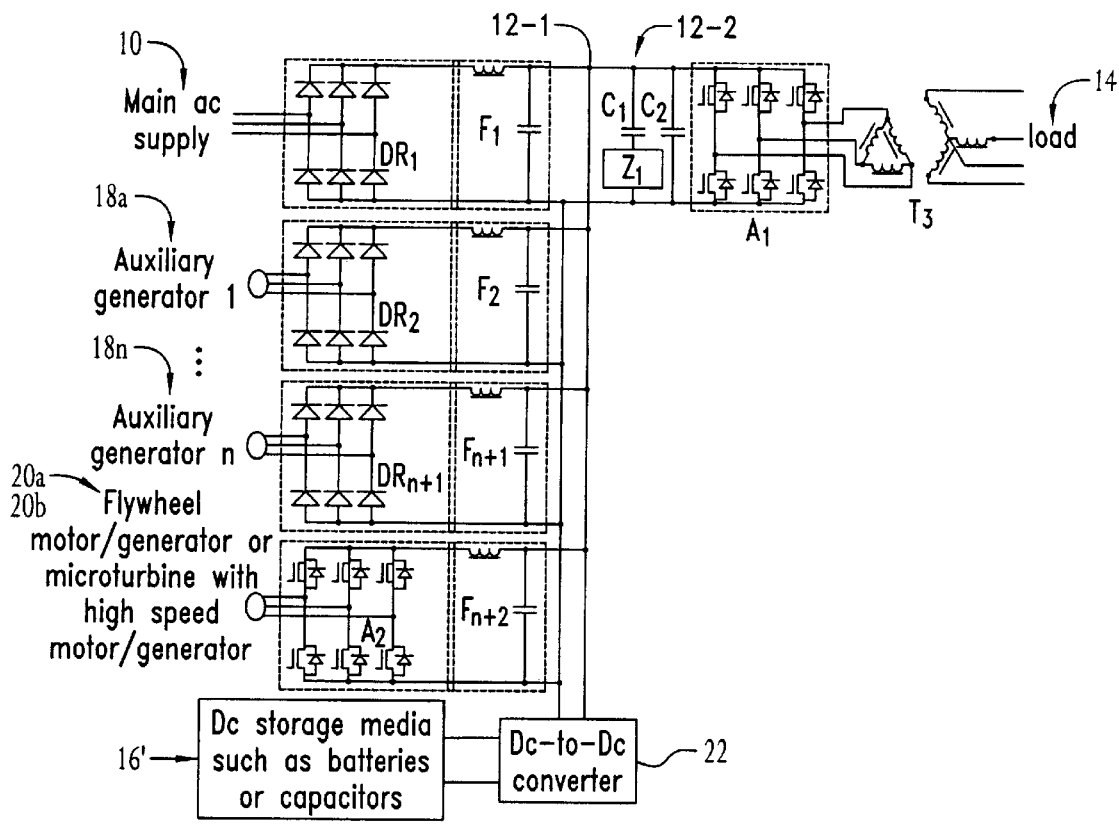
FIG. 4
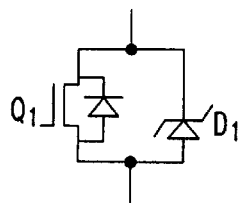
FIG. 4(a)    FIG. 4(b)
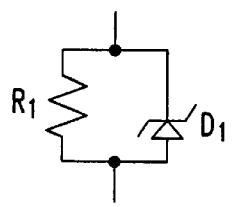    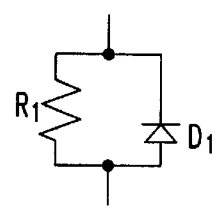
FIG. 4(c)    FIG. 4(d)

UNINTERRUPTIBLE POWER SUPPLY

FIELD OF THE INVENTION

The present invention relates generally to power transmission and distribution systems, and more particularly to a novel Uninterruptible Power Supply (UPS) designed to be coupled to at least one auxiliary source of ac power.

BACKGROUND OF THE INVENTION

FIG. 1 is a one-line diagram of a typical arrangement of a main ac supply (e.g., power grid) 10, an on-line UPS 12, a load 14 and a battery bank 16. The on-line UPS typically contains a controlled rectifier $DR_1$, a dc-to-ac inverter $A_1$, a static bypass switch $S_1$, and isolation transformers $T_1$ and $T_2$ ($T_2$ is typically a nine-winding transformer, with a three-phase primary for $S_1$, a three-phase primary for $A_1$ and a three-phase secondary for the load). The dc bus 12-1 is designed specifically to support the bank of batteries 16. The bus can provide charging current and also draw current from the batteries in the event of an outage on the main ac supply 10. UPSs usually contain a static (electronic) bypass switch $S_1$ so that the output of inverter $A_1$ can be switched to the main supply 10 in the event of a fault or high inrush load.

FIG. 2 depicts an example of a system employing an auxiliary generator 18 in combination with a UPS 12. Battery supplied UPSs provide backup power for short periods of time, typically on the order of minutes. The backup time can be substantially increased by adding a generator to the system. This is typically accomplished using an automatic transfer switch $S_2$ at the input of the UPS 12, as shown in FIG. 2. When the main ac power supply 10 fails, the batteries 16 supply power to the UPS. If the power remains down for a predetermined period of time, the automatic transfer switch $S_2$ will start the auxiliary generator 18 and switch the UPS 12 input to the auxiliary generator output through $S_2$.

The solution shown in FIG. 2 has several drawbacks:

1. The controlled rectifier $DR_1$ in the UPS 12 tends to draw harmonically rich currents that are not easily handled by the generator 18. It is therefore necessary to oversize the generator or to add substantial filtering in front of the UPS. Both of these solutions increase cost and losses.
2. Operating the generator 18 in grid-parallel mode requires added complexity. Circuitry must be provided for synchronizing the generator with the grid (i.e., the mains 10). In most circumstances, parts must also be added to prevent the generator from generating power into the grid in the event of a power failure.

Accordingly, a goal of the present invention is to provide a combined UPS/auxiliary generator system that avoids the problems discussed above, and that provides improved compatibility with many forms of stored or generated energy.

SUMMARY OF THE INVENTION

The present invention provides an electronic circuit, such as, e.g., a UPS, for interfacing a main ac power source and at least one secondary power source to a load. The secondary power source(s) may include one or more auxiliary generators, a flywheel motor generator or microturbine with high speed motor generator, and/or any of a variety of dc storage devices. The electronic circuit, which in a presently preferred implementation is a UPS, comprises a dc bus, a first uncontrolled rectifier in combination with a first filter for coupling the main ac power supply to the dc bus, a second uncontrolled rectifier in combination with a second filter for coupling the auxiliary generator to the dc bus, and a dc-to-ac inverter (between the dc bus and the load) for providing ac output power to the load.

As discussed in greater detail below, the present invention provides a combined UPS/auxiliary generator system that avoids the problems of the prior art and offers improved compatibility with many forms of stored or generated energy. Other features of the present invention are disclosed below.

BRIEF DESCRIPTION OF THE DRAWINGS

FIG. 4 depicts the presently preferred embodiment of the invention in greater detail. As shown, all generation and storage devices interface with the dc bus through an uncontrolled rectifier or dc-to-dc converter, as appropriate. Impedance $Z_1$ allows capacitor $C_1$ to charge to a voltage just under the dc bus voltage, thus providing short term backup power without affecting the steady-state power factor load seen by the main ac supply or the auxiliary generators.

FIGS. 4(a)–4(d) depict examples of impedance $Z_1$ for controlled charging and discharging of bus capacitor $C_1$.

DETAILED DESCRIPTION OF PREFERRED EMBODIMENTS

As discussed above, combining a backup generator with a UPS typically requires an automatic transfer switch and an oversized generator. Furthermore, operating that generator in parallel with the power grid often requires a synchronizer and special protection equipment to prevent net power flow into the power grid. The present invention reduces the parts count and increases the compatibility of the generator with the power electronic equipment, thus removing the need to oversize the generator. The invention also provides a simple method for paralleling many storage and generation devices with a very high power factor to the sources, regardless of the load power factor.

Figure 1:
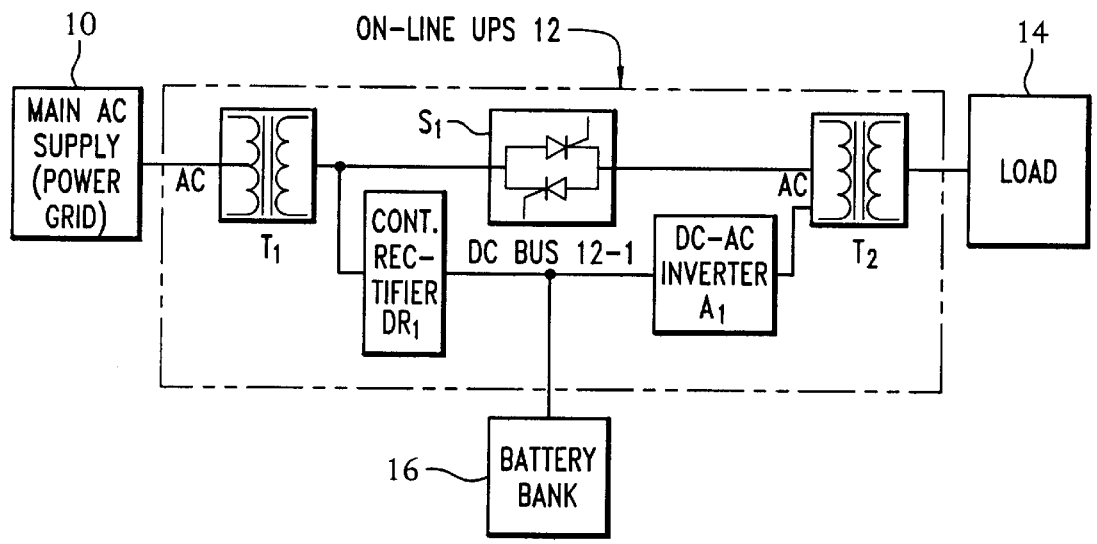
FIG. 1 is a one-line diagram of a typical on-line UPS.
Figure 2:
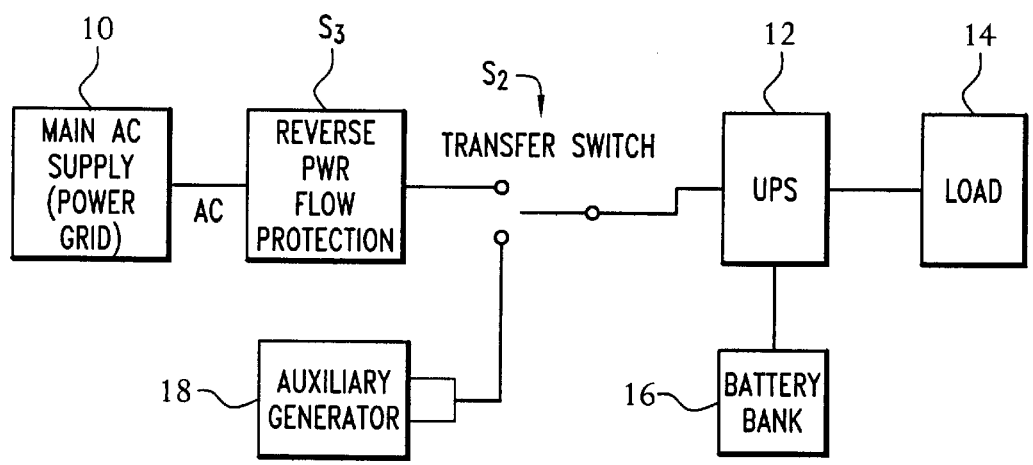
FIG. 2 is a one-line diagram of an on-line UPS with backup generator and automatic transfer switch. This system includes protective equipment to prevent reverse power flow into the main ac supply, as well as circuitry (not shown) for synchronizing the generator with the grid.
Figure 3:
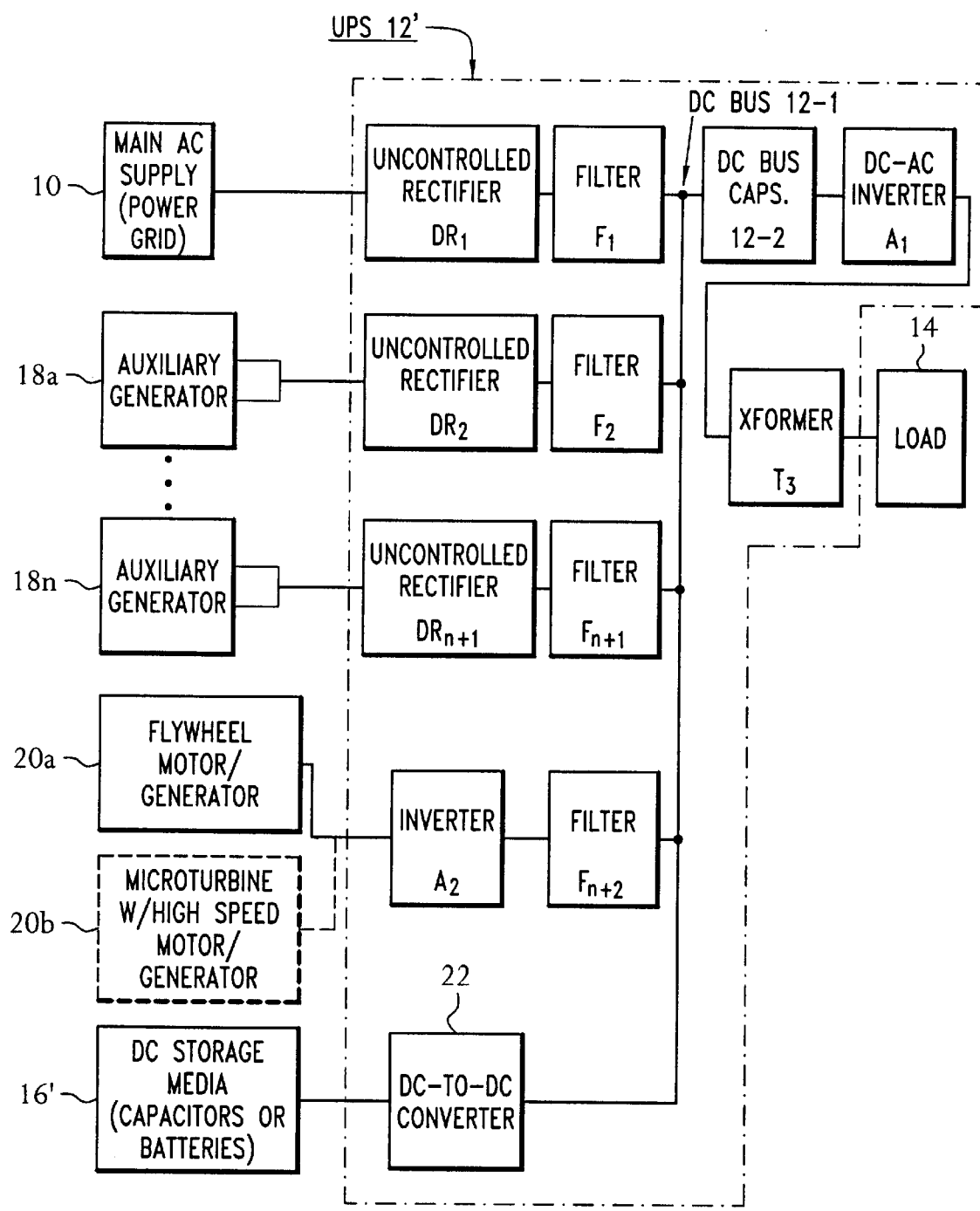
FIG. 3 schematically depicts a preferred embodiment of a UPS in accordance with the present invention, in combination with auxiliary generators and dc storage media.

FIGS. 3 and 4 depict preferred embodiments of the invention. As shown in FIG. 3, the inventive UPS system includes a UPS 12' comprising uncontrolled rectifiers $DR_1$ through $DR_{n+1}$, inverter $A_2$, dc-to-dc converter 22, filters $F_1$ through $F_{n+2}$, DC bus capacitors 12-2 (which as described below are combined with passive impedance elements), inverter $A_2$, and transformer $T_3$. As shown, the UPS may be coupled to a number of auxiliary generators 18a–18n, a flywheel motor/generator 20a or a microturbine with high speed motor generator 20b, and/or dc storage media 16'.

FIG. 4 is a more detailed illustration of the configuration depicted in FIG. 3. The UPS systems shown in FIGS. 3 and 4 provide a high power factor load to either the main ac power supply or to at least one auxiliary generator, such as one or more of auxiliary generators 18a through 18n. Furthermore, the auxiliary generator(s) does not require any synchronizing with the main ac power, nor does the system require any protection against generating power into the grid during a power failure, because the uncontrolled diode rectifier $DR_1$ automatically prevents any current flow back into the main ac supply or grid 10.

During normal operation, the main ac supply 10 provides unfiltered voltage to the dc bus 12-1 through rectifier $DR_1$. A dc bus capacitor $C_2$ (FIG. 4) is relatively small and provides the high frequency current required by inverter $A_1$. An impedance $Z_1$ allows another dc bus capacitor $C_1$ to charge up to a voltage just below the nominal dc bus voltage. Capacitor $C_1$ therefore draws little or no current during normal operation unless the main ac power supply experiences a sag in voltage.

FIGS. 4(a)–4(d) depict some examples of impedance $Z_1$. As shown, impedance $Z_1$ can be comprised of many combinations of passive and active components. FIGS. 4(a)–4(d) are not intended to be an exhaustive list, but rather to show a few basic examples. FIG. 4(a) shows that $C_1$ may be connected directly across the bus. FIG. 4(b) shows that switch $Q_1$ allows controlled charging of $C_1$, with zener diode $D_1$ helping to clamp voltage spikes on the dc bus. FIG. 4(c) shows that capacitor $C_1$ charges through zener diode $D_1$ and resistor $R_1$, with zener diode $D_1$ helping to clamp voltage spikes on the dc bus and also allowing $C_1$ to discharge into the dc bus. FIG. 4(d) shows that $C_1$ charges through resistor $R_1$, with diode $D_1$ allowing $C_1$ to discharge into the dc bus.

Referring again to FIG. 4, for cases where the UPS 12' draws approximately constant current from the dc bus 12-1, the power factor seen by a three phase ac supply will be approximately 95%. A small amount of passive filtering can be added if it becomes necessary to improve the power factor past 95%; however, it should be pointed out that this power factor is far better than would be drawn by a conventional UPS. The filters $F_1$–$F_{n+2}$ shown in FIGS. 3 and 4 are only needed if more than one source must operate at the same time with a high power factor. The filters shown are only examples, and many other combination of passive and active elements can be combined to perform filtering. The filter elements shown for $F_1$ can be relatively small because they are filtering out frequencies six times the source frequency.

To run a generator, it merely needs to be started. No synchronizing is required. In fact, the generator need not operate at the same frequency as the main ac source. Thus, the auxiliary generator(s) 18a–18n can operate at 50 Hz, 60 Hz, 400 Hz, or even at high frequency as would be the case for some microturbines. This system requires no mechanical or semiconductor switches for connecting the generator.

Many storage media 16' can conveniently be interfaced with the dc bus, either directly or using the dc-to-dc converter 22. For example, a flywheel energy storage device could provide power to the dc bus in the event of a failure of the main ac supply 10. In this case, inverter $A_2$ spins the flywheel up to speed. If the flywheel motor/generator 20a has an adjustable field, then the voltage amplitude can be kept constant while the diodes built into inverter $A_2$ act as an uncontrolled rectifier to remove the power from the flywheel motor/generator. If the amplitude of the output voltage of the motor/generator 20a or 20b cannot be held constant, then inverter $A_2$ can be pulse width modulated to provide a constant power flow to the dc bus 12-1.

One could also interface other generation devices with the dc bus 12-1. For example, dc generation devices such as solar cells or fuel cells could be interfaced with the dc bus through the use of the dc-to-dc converter 22. In addition, other ac generators can be interfaced with the dc bus through other three-phase uncontrolled rectifiers. It is thus possible to parallel many small generators of different types and frequencies. The load power factor seen by each generator would be relatively high, removing the need for extra filtering or oversizing of generators.

Generators are typically designed for standard voltages identical to the voltages produced by distribution transformers. The main ac supplies and generators will therefore be unlikely to require any voltage transformation to interface with the dc bus. For cases where non-standard voltages are produced, particularly as might be the case with high speed generators (such as a flywheel motor/generator 20a or microturbine with high speed motor/generator 20b), transformers could be placed between the generator output and the uncontrolled rectifier connecting it to the dc bus 12-1. In the case of high speed motor generators, the transformer could be designed for high frequency and therefore be made smaller than would be required at low frequencies. For cases where the voltage amplitude is expected to vary over a significant range (as would be the case for a permanent magnet generator spinning over a large speed range), tap changing transformers can be added between the source and the dc bus to provide voltage to the dc bus over a much narrower range of voltage.

Conclusion

In sum, the present invention is directed to power systems containing a UPS or the like having at least one uncontrolled rectifier connecting an ac power source of one or more phases to a dc bus, and an inverter that converts the power from the dc bus to an ac voltage with one or more phases. In a presently preferred form, the invention also includes one or more ac and/or dc power sources connected to the dc bus such that the ac power source(s) is connected to the dc bus via an uncontrolled rectifier and the dc source(s) is connected to the dc bus either directly or through a dc-to-dc converter. In this example, the dc-to-dc converter is unidirectional when the dc source does not need to receive any power and bi-directional if the dc source needs to receive current from the dc bus for purposes of charging, such as would be the case for a battery or capacitor. The other power sources include but are not limited to: other utility supplies which have been transformed to the same or nearly the same voltage as the main ac supply; auxiliary generators operating at voltages nearly the same as the main ac supply; auxiliary generators with appropriate voltage transformation to operate at the same or nearly the same voltage as the main ac supply; microturbines connected to high speed generators with or without voltage transformers on the output as appropriate to provide the proper voltage amplitude to the dc bus; flywheel energy storage systems; a battery or batteries; capacitors; solar cells; and/or fuel cells.

In addition, as discussed above, flywheel motor generators or microturbine high speed motor generators may be attached to the dc bus via an inverter (and possibly also an uncontrolled rectifier) for purposes of spinning the motor using power from the dc bus, and possibly for providing voltage transformation from the device to the dc bus. The dc bus has coupled across it (a) a capacitor or (b) a capacitor in series with a combination of series or passive elements. The purpose of the elements in series with the capacitor is to control the charging and discharging of the capacitor in such a way as to do any or all of the following: (i) to produce relatively high nominal power factor as seen by ac sources connected to the dc bus through an uncontrolled rectifier; (ii) to provide filtering; (iii) to provide clamping of surges on the dc bus; and (iv) to allow discharge of the capacitor to prevent sagging of the dc bus. The passive and active elements in series with the capacitor may include a zener diode (or any voltage clamping means) in parallel with a semiconductor switch. A resistor may also be coupled in parallel with the zener diode (or other voltage clamping means).

Finally, one or more of the dc connections of each device tied to an uncontrolled or controlled rectifier may include a filter to increase the power factor seen by the generators or utility feeds.

The scope of protection of the following claims is not limited to the presently preferred embodiments described above. For example, one could also interface single phase ac sources to the dc bus using single phase rectifiers and large filters, or one could interface dc generators directly to the bus. It is also possible to use controlled rectifiers to control the power being drawn by each ac power source. Other modifications of the presently preferred embodiments will be apparent in view of the above detailed description.

What is claimed is:

1. An uninterruptible power supply (UPS), comprising:
   (a) a dc bus;
   (b) a first uncontrolled rectifier in combination with a first filter for coupling a main ac power supply to the dc bus with a first power factor;
   (c) a second uncontrolled rectifier in combination with a second filter for coupling an auxiliary generator to the dc bus with a second power factor; and
   (d) a dc-to-ac inverter operatively coupled to the dc bus for providing ac output power to a load;
   wherein the first and second power factors are greater than or equal to approximately 0.95.

2. An uninterruptible power supply (UPS), comprising:
   (a) a dc bus;
   (b) a first uncontrolled rectifier in combination with a first filter for coupling a main ac power supply to the dc bus with a first power factor;
   (c) a second uncontrolled rectifier in combination with a second filter for coupling an auxiliary generator to the dc bus with a second power factor;
   (d) a dc-to-ac inverter operatively coupled to the dc bus for providing ac output power to a load; and
   a dc bus capacitor circuit operatively coupled to the dc bus and the dc-to-ac inverter.

3. A UPS as recited in claim 2, wherein the dc bus capacitor circuit comprises a first capacitor ($C_1$) in series with an impedance circuit ($Z_1$).

4. A UPS as recited in claim 3, wherein the impedance circuit $Z_1$ comprises a low resistance conductor.

5. A UPS as recited in claim 3, wherein the impedance circuit $Z_1$ comprises an electronic switching device in parallel with a zener diode.

6. A UPS as recited in claim 3, wherein the impedance circuit $Z_1$ comprises a resistor ($R_1$) in parallel with a diode.

7. A UPS as recited in claim 6, wherein the diode is a zener diode.

8. A UPS as recited in claim 3, wherein the impedance circuit $Z_1$ comprises means for controlling the charging and discharging of the capacitor $C_1$ in such a way as to produce a high nominal power factor as seen by the ac sources connected to the dc bus through the uncontrolled rectifiers.

9. A UPS as recited in claim 3, wherein the impedance circuit $Z_1$ comprises means for controlling the charging and discharging of the capacitor $C_1$ in such a way as to provide filtering.

10. A UPS as recited in claim 3, wherein the impedance circuit $Z_1$ comprises means for controlling the charging and discharging of the capacitor $C_1$ in such a way as to provide clamping of surges on the dc bus.

11. A UPS as recited in claim 3, wherein the impedance circuit $Z_1$ comprises means for controlling the charging and discharging of the capacitor $C_1$ in such a way as to allow discharge of the capacitor to prevent sagging of the dc bus.

12. An uninterruptible power supply (UPS), comprising:
    (a) a dc bus;
    (b) a first uncontrolled rectifier in combination with a first filter for coupling a main ac power supply to the dc bus with a first power factor;
    (c) a second uncontrolled rectifier in combination with a second filter for coupling an auxiliary generator to the dc bus with a second power factor;
    (d) a dc-to-ac inverter operatively coupled to the dc bus for providing ac output power to a load; and
    a dc bus capacitor circuit operatively coupled to the dc bus and the dc-to-ac inverter, wherein the dc bus capacitor circuit comprises means for controlling the charging and discharging of the capacitor $C_1$ in such a way as to produce high nominal power factors as seen by the ac sources connected to the dc bus through the uncontrolled rectifiers, and wherein the nominal high power factors are greater than or equal to approximately 0.95.

13. A power system, comprising a main ac supply, an auxiliary generator, a load, and an electronic circuit operatively coupled to the main ac supply auxiliary generator and load; wherein the electronic circuit comprises a dc bus, a first uncontrolled rectifier for coupling the main ac supply to the dc bus, a second uncontrolled rectifier for coupling the auxiliary generator to the dc bus, a dc-to-ac inverter operatively coupled to the dc bus for providing ac output power to the load; and further comprising a flywheel motor generator and a second inverter interfacing the flywheel motor generator to the electronic circuit, whereby dc bus voltage may be used to start the motor generator for the purpose of storing energy with the flywheel.

14. A power system, comprising a main ac supply; an auxiliary generator; a load; an electronic circuit operatively coupled to the main ac supply auxiliary generator and load; wherein the electronic circuit comprises a dc bus, a first uncontrolled rectifier for coupling the main ac supply to the dc bus, a second uncontrolled rectifier for coupling the auxiliary generator to the dc bus, a dc-to-ac inverter operatively coupled to the dc bus for providing ac output power to the load; and further comprising a microturbine with a high speed motor generator and a second inverter interfacing the motor generator to the electronic circuit, whereby dc bus energy may be used to turn the motor generator for the purpose of starting the microturbine.

15. A power system, comprising a main ac supply, an auxiliary generator, a load, and an electronic circuit operatively coupled to the main ac supply auxiliary generator and load; wherein the electronic circuit comprises a dc bus, a first uncontrolled rectifier for coupling the main ac supply to the dc bus, a second uncontrolled rectifier for coupling the auxiliary generator to the dc bus, a dc-to-ac inverter operatively coupled to the dc bus for providing ac output power to the load; and further comprising a dc storage device and a dc-to-dc converter interfacing the dc storage device to the dc bus of the electronic circuit.

16. A power system as recited in claim 15, wherein the dc storage device comprises a member of a group consisting of batteries, capacitors, solar cells and fuel cells.

17. A power system, comprising a main ac supply, an auxiliary generator, a load, and an electronic circuit operatively coupled to the main ac supply auxiliary generator and load; wherein the electronic circuit comprises a dc bus, a first uncontrolled rectifier for coupling the main ac supply to the dc bus, a second uncontrolled rectifier for coupling the auxiliary generator to the dc bus, a dc-to-ac inverter operatively coupled to the dc bus for providing ac output power to the load; and further comprising means for producing a high nominal power factor as seen by the main ac supply and auxiliary generator, wherein the high nominal power factor is at least approximately 0.95.

18. A power system, comprising a main ac supply, an auxiliary generator, a load, and an electronic circuit operatively coupled to the main ac supply auxiliary generator and load; wherein the electronic circuit comprises a dc bus, a first uncontrolled rectifier for coupling the main ac supply to the dc bus, a second uncontrolled rectifier for coupling the auxiliary generator to the dc bus, a dc-to-ac inverter operatively coupled to the dc bus for providing ac output power to the load; and further comprising means to provide clamping of surges on the dc bus.

19. A power system, comprising a main ac supply, an auxiliary generator, a load, and an electronic circuit operatively coupled to the main ac supply auxiliary generator and load; wherein the electronic circuit comprises a dc bus, a first uncontrolled rectifier for coupling the main ac supply to the dc bus, a second uncontrolled rectifier for coupling the auxiliary generator to the dc bus, a dc-to-ac inverter operatively coupled to the dc bus for providing ac output power to the load; and further comprising means to prevent voltage sagging on the dc bus.

* * * * *